CHANNEL SELECTING CIRCUIT UTILIZING DIODE CONNECTION MEANS

Filed Sept. 19, 1961 2 Sheets-Sheet 1

INVENTOR
O. F. GERKENSMEIER
BY
Charles Scott Phelan
ATTORNEY

Nov. 24, 1964 O. F. GERKENSMEIER 3,158,692

CHANNEL SELECTING CIRCUIT UTILIZING DIODE CONNECTION MEANS

Filed Sept. 19, 1961 2 Sheets-Sheet 2

INVENTOR
O. F. GERKENSMEIER
BY
[signature]
ATTORNEY

United States Patent Office 3,158,692

Patented Nov. 24, 1964

3,158,692

CHANNEL SELECTING CIRCUIT UTILIZING DIODE CONNECTION MEANS

Otto F. Gerkensmeier, New York, N.Y., assignor to Bell Telephone Laboratories, Incorporated, New York, N.Y., a corporation of New York Filed Sept. 19, 1961, Ser. No. 139,580
10 Claims. (Cl. 179—15)

Figure 1:
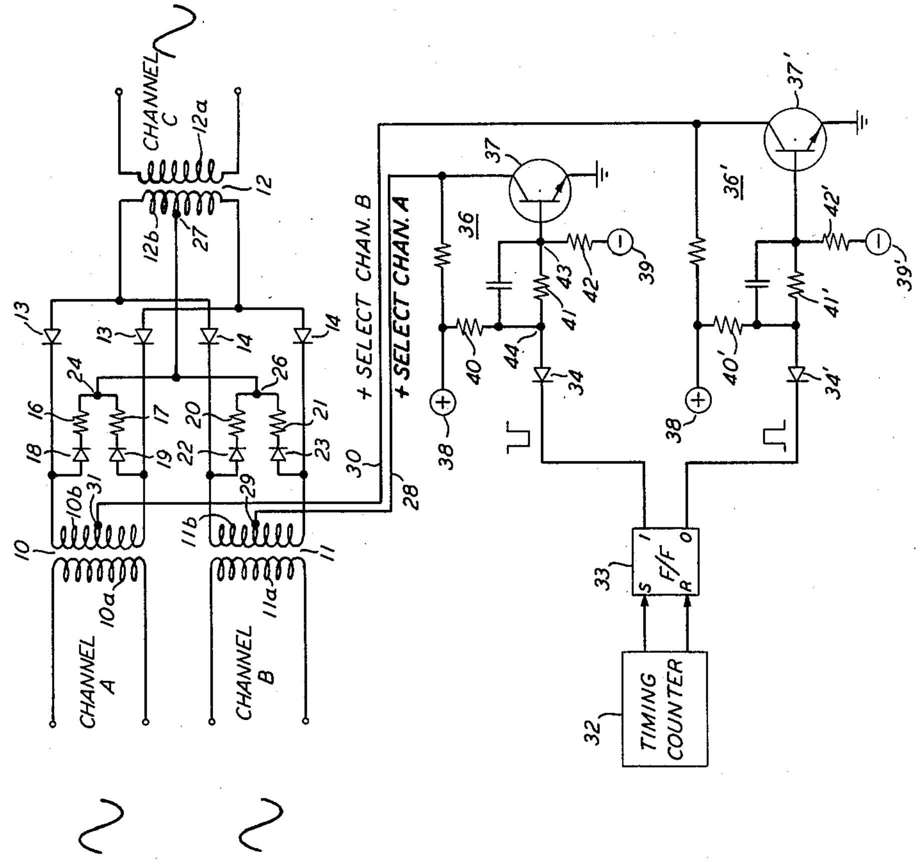

This invention relates to a channel selecting circuit for use in establishing communication between signal transmission channels.

When it becomes necessary to interconnect plural communication channels for transmission in different arrangements and combinations it is also often desirable to arrange the selection of channels which are to be interconnected at any particular time so that other channels that are not to be included in the interconnection may be properly terminated with their characteristic impedance. If this is done, subsequent changes in channel connections will cause a minimum amount of disturbance in the interconnected channels as well as in those channels which are not included in a particular connection.

Accordingly, it is a principal object of the present invention to interconnect a first communication channel with one or more other communication channels in a group of channels and to perform such interconnection with a minimum of disturbance on all channels.

Another object is to switch a first communication channel from a second communication channel to a third communication channel with a minimum of disturbance to all channels.

An additional object is to change interconnections among communication channels in a rapid and efficient manner.

These and other objects of the invention are accomplished in an illustrative embodiment in which center tapped inductive means are connected across each of a plurality of communication channels which it may be desired to interconnect. A separate pair of diodes, hereinafter called transmission diodes, is connected in series between the terminals of inductive means connected to a first channel and the terminals of the inductive means of each of the other channels. A bias control signal is applied between the center tap of the inductive means that is connected to the first channel and a center tap of the inductive means of at least one of the mentioned other channels. This control signal biases the transmission diodes connected to one of the mentioned other channels off or on to control the transmission of signals between such channel and the first channel.

In one embodiment of the invention wherein a first communication channel is to receive signals from either one of two other communication channels, both of the latter two channels include center tapped inductive means with bias control signals applied to the center taps. However, the control signal which controls one of the two other channels is also applied through its associated inductance means to the center tap of the transformer connected to the first channel.

It is one feature of the invention that when a channel selection is made in accordance with the invention, signals may be transmitted in either direction between the interconnected channels.

Another feature of the invention is that when a channel is not selected for interconnection it is automatically terminated with its characteristic impedance.

An additional feature is that channel selections may be accomplished in a rapid and efficient manner without utilizing moving parts of any kind.

A still further feature of the invention is that different time sequential portions of a signal in a first communication channel may be routed to different ones of additional communication channels in increments which may comprise as little as a fraction of a cycle of the controlled oscillatory signal.

Featured structure of the invention includes transmission diodes interconnecting the conductors of communication channels, each of which channels includes shunt-connected inductive means on the channel side of the transmission diodes. The mentioned diodes are biased on or off in accordance with the dictates of a control current applied to the diodes through a half-phantom type of control circuit including the various inductive means.

Figure 2:
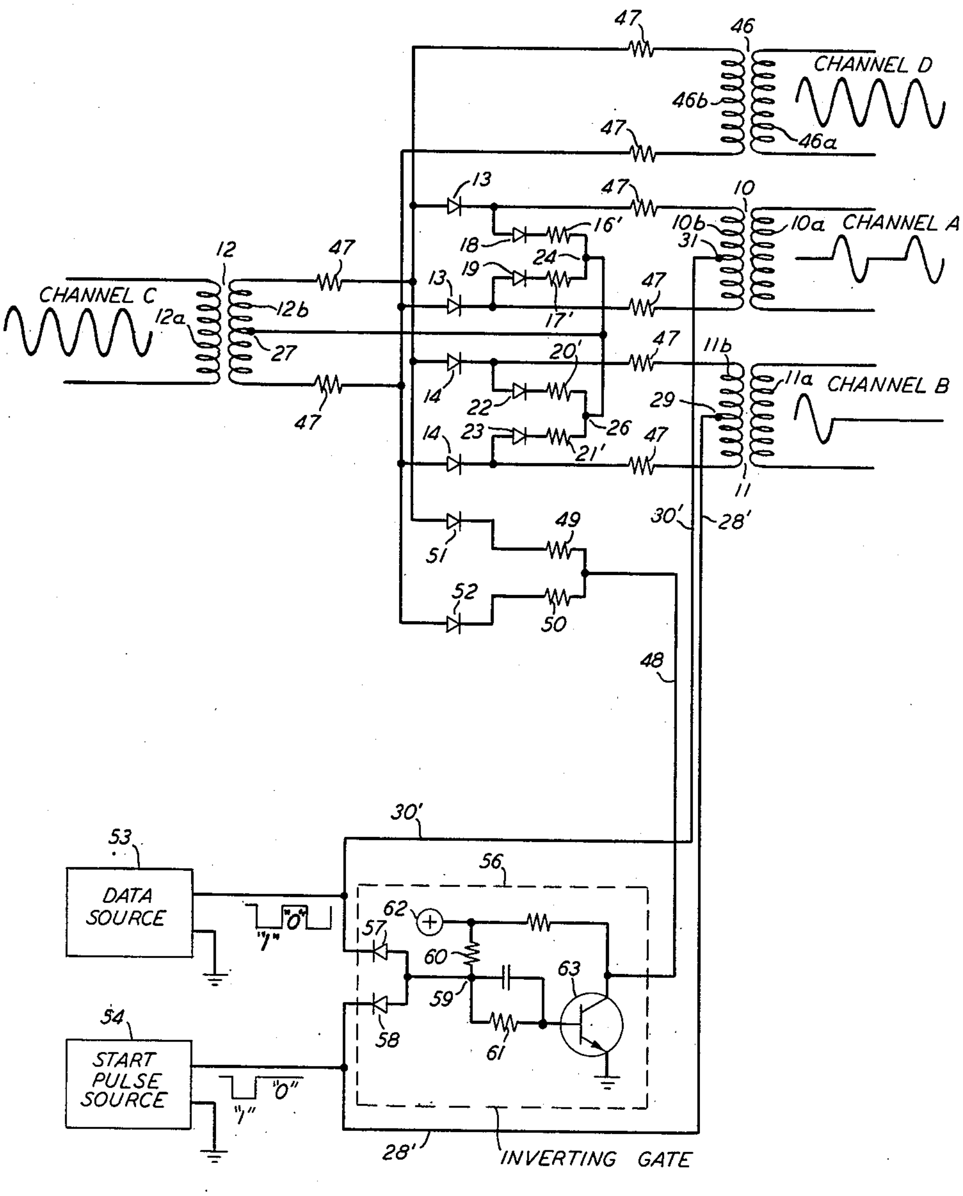

A full concept of the present invention together with all of its various objects, features and advantages, in addition to those specifically hereinbefore mentioned, may be obtained from a consideration of the following detailed description together with the appended claims and the attached drawing in which:

FIG. 1 is a schematic diagram of a transmisison gate in accordance with the invention; and FIG. 2 is a dipulse modulator utilizing the invention.

In FIG. 1 the transmission gate shown is adapted for coupling signals on either one of the signal communication channels A or B to a third communication channel C. For this purpose, a separate one of three transformers 10, 11, and 12 is connected to each of the channels A through C. In some applications a shunt-connected impedance coil could be employed in place of each transformer. Each transformer has and *a* and a *b* winding and the *a* winding is connected to the respective channel while the *b* winding is connected in the channel and to the channel selecting circuit of the invention.

A first pair of diodes, hereafter called transmission diodes 13, 13, is connected in series in the channel A conductors between the terminals of winding 10*b* and winding 12*b*. In a similar fashion the transmission diodes 14, 14 are connected in series in channel B conductors between the terminals of winding 11*b* and winding 12*b*. In each case the diodes 13 and 14 are all poled for the forward conduction of electric current in the same direction with respect to the terminals of winding 12*b*. In the case illustrated, all of the diodes 13 and 14 are poled for forward conduction away from the terminals of winding 12*b*.

Two terminating resistors 16 and 17 are connected in series between the terminals of winding 10*b* by means of two diodes, hereafter called terminating diodes 18 and 19. Resistors 16 and 17 are given resistance values such that their series combination resistance as seen from the terminals of winding 10*a* is approximately equal to the characteristic impedance of channel A. Diodes 18 and 19 are both poled for conduction from their respective transformer winding terminals toward the terminating resistors 16 and 17. In a similar manner, terminating resistors 20 and 21 and terminating diodes 22 and 23 are connected together in a series circuit between the terminals of winding 11*b*. Resistors 20 and 21 are assigned a total series resistance which when seen from the terminals of winding 11*a* is approximately equal to the characteristic impedance of channel B.

A center terminal 24 between resistors 16 and 17 is connected to a similar center terminal 26 between terminating resistors 20 and 21 and to a center tap 27 on transformer winding 12*b*. Control signals are applied by means of a half-phantom type of control circuit for biasing the pairs of terminating and transmission diodes off or on in accordance with a pattern which results in electric signal coupling between channel C and one of the channels A or B while the other channel B or A is properly terminated with its characteristic impedance.

A first control signal is applied to the center tap 27 of transformer winding 12*b* and may comprise, for example, a positive-going signal applied on a lead 30 to a center tap 31 of transformer winding 10*b*. This control signal is connected to center tap 27 through the two halves of winding 10*b* and through terminating resistors and diodes 16–19. A second control signal, which preferably has a complementary amplitude characteristic with respect to the signal on lead 30, may be applied by a lead 28 to a center tap 29 on transformer winding 11*b*.

Assuming a positive control signal on lead 30, a current would be driven through the two halves of transformer winding 10*b* to block transmission diodes 13 and bias terminating diodes 18 and 19 into conduction. The resulting control current flows through terminating diodes 18 and 19, terminating resistors 16 and 17, and terminal 24 to the center tap 27 of transformer winding 12*b*. At this point the control current splits and passes through the two halves of winding 12*b*, through transmission diodes 14 and the two halves of transformer winding 11*b* to center tap 29 and lead 28. Terminating diodes 22 and 23 are reversely biased by the potential difference between terminal 26 and the end terminals of winding 11*b*. Thus, transmission is enabled between channel B and channel C, through transformers 11 and 12 and transmission diodes 14. Channel A, which is not selected for coupling, sees through its transformer 10 the series combination of resistors 16 and 17 which constitute its characteristic impedance.

It is preferable if the control potentials on leads 28 and 30 are large enough so that they have complete control of the bias of the transmission diodes. If this is done it will be certain that none of the signals in the various channels may overcome the control potential and change the bias conditions of the transmission diodes.

If the signals on leads 28 and 30 are reversed so that lead 28 is now positive and lead 30 is at ground the situation in the channel selecting circuit is also reversed. Control current now flows from center tap 29 through the two halves of winding 11*b* and the terminating diodes 22 and 23 together with their associated resistors 20 and 21 to center tap 27 of transformer winding 12*b*. This control current then flows from the terminals of winding 12*b* through transmission diodes 13 and the two halves of transformer winding 10*b* back to control lead 30.

The reader's attention is now directed to the source of the complementary control signals applied to leads 28 and 30. In some applications it may be desirable to switch the input of channel C back and forth between channels A and B for predetermined time intervals of connection with each. For this purpose, a timing counter 32 might be employed to measure such time intervals, and its output signals would set or reset a flip-flop circuit 33, depending upon which of the channels A or B is to be connected to channel C. Flip-flop 33 may be one of the well known bistable multivibrators which produce output voltages at its ONE and ZERO output terminals and wherein the application of a triggering signal to at least one input terminal produces a transfer from one stable condition to the other. The ONE output of flip-flop 33 may be coupled through a diode 34 to a common emitter transistor amplifier 36. An output of amplifier 36 is connected to control lead 28. The emitter electrode of a transistor 37 in amplifier 36 is connected to ground and its collector electrode is connected to lead 28 as well as to the positive terminal of a source of potential which is schematically represented by the circled plus and minus terminals 38 and 39. Potential dividing resistors 40, 41 and 42 are connected in series between the terminals 38 and 39. The common terminal 43 between resistors 41 and 42 is connected to the base electrode of transistor 37 while the common terminal 44 between resistors 40 and 41 is connected to the anode of diode 34.

A ground ONE output from flip-flop circuit 33 biases diode 34 into conduction and causes transistor 37 to be biased off, thereby placing a positive potential on control lead 28. However, if a positive ONE output is derived from flip-flop circuit 33 it cooperates with the potential established at terminal 44 by potential dividing resistors 40–42 for reversely biasing diode 34 and thereby permitting transistor 37 to conduct to pull the potential at control lead 28 to ground.

The ZERO output of flip-flop circuit 33 is connected through a diode 34′ and an amplifier 36′ to control lead 30. Diode 34′ and amplifier 36′ correspond exactly with diode 34 and amplifier 36, respectively, and need not be further described. It will be seen, however, that for any given condition of the output at flip-flop 33 one of the diodes 34 and 34′ is biased on and the other is biased off, thereby causing similar complementary amplitude conditions to exist in the control voltages which appear at control leads 28 and 30.

In FIG. 2 there is illustrated a dipulse modulator which employs essentially the same basic principles of operation as the transmission gate illustrated in FIG. 1. Accordingly, circuit elements in FIG. 2 which correspond to elements of the circuit in FIG. 1 are provided with the same or similar reference characters to indicate this correspondence. In this case, a continuous sinusoidal oscillation wave is applied to winding 12*a* of transformer 12 and its successive portions are coupled by the channel selecting circuits of the invention to one or the other of the transformers 10 and 11. An addition in the form of a transformer 46 is provided for continuously coupling the sinusoidal signals to a fourth channel, designated channel D.

The terminals of winding 46*b* are directly connected to the terminals of winding 12*b* through four building-out resistors which are all designated as resistors 47. If transformers suitable for operation at the correct characteristic impedances are used, resistors 47 may be omitted. Identical resistors are also connected in series with each of the terminals of transformer windings 10*b* and 11*b* for the same purpose. In the latter cases, however, the use of these resistors requires some modification in the resistances assigned for terminating resistors 16′, 17′, 20′ and 21′ in order that they may provide proper terminating impedances for their respective channel circuits. In one dipulse modulator arrangement wherein channels A and B had substantially equal characteristic impedances, it was found to be convenient to use for each of the resistors 47 a resistance which was approximately equal to one-fourth of the resistance of one of the terminating resistors 16′, 17′, 20′ or 21′.

In FIG. 2 a third control signal input lead 48 is employed for applying a control signal to the center tap of transformer winding 12*b*. This signal is applied from lead 48 through two terminating resistors 49 and 50, two additional terminating diodes 51 and 52, two of the resistors 47, and the two halves of winding 12*b*. The diodes 51 and 52 are poled for forward conduction in the same direction with respect to their corresponding terminating resistors 49 and 50, i.e., for conduction from winding 12*b* toward control lead 48. In one typical situation resistance values assigned for resistors 49 and 50 were about two times the resistance of one of the resistors 16′, 17′, 20′, or 21′.

Control signals in FIG. 2 are applied from two sources 53 and 54 which may comprise, for example, a data source and a start pulse source in a data transmission system station. In such a station the control signals from sources 53 and 54 will usually be in time phase with the sine wave in channel C. Rectangular data pulses in the output of source 53 may include ground pulses representing data ONE's and positive pulses representing data ZERO's. These pulses are applied by means of control lead 30′ to the center tap 31 of transformer winding 10*b*. In a similar manner, rectangular output pulses from start pulse source 54, and again with ground pulses being designated ONE's and positive signals being designated ZERO's, are applied by lead 28′ to center tap 29 on transformer winding 11*b*.

Connections are also taken from control leads 30′ and 28′ to an inverting AND logic gate 56 wherein the control lead connections are applied to the cathodes of two AND-connected diodes 57 and 58. The anodes of these two diodes are connected together and to a terminal 59 which is included between two resistors 60 and 61 that are connected in series between the positive terminal of a potential source schematically represented by the circle plus terminal 62 and the base electrode of a transistor 63 which is arranged in the common emitter configuration with its emitter electrode connected to ground for providing a current return path to source terminal 62. The collector electrode of transistor 63 is connected to control lead 48.

With the arrangement shown, one of the control leads 28′, 30′, or 48 always has a complementary amplitude condition with respect to the other two control leads. For example, if a ground ONE start pulse appears in the output of source 54 a positive ZERO pulse would appear in the output of source 53 so that control leads 30′ and 28′ would be positive and ground, respectively. However, under these conditions diode 58 is enabled and causes the base electrode of transistor 63 to be drawn to a potential which is negative with respect to ground and thereby bias transistor 63 off. The collector electrode of this transistor is then at a positive potential, and control lead 48 is also positive. Thus, leads 48 and 30′ are positive while lead 28′ is at ground.

If the outputs of sources 53 and 54 should be reversed, lead 30′ goes to ground and lead 28′ goes to a positive potential; but gate 56 is still disabled and has a positive voltage on its output and applied to control lead 48. When both pulse sources 53 and 54 display positive output potentials, diodes 57 and 58 are biased off and thereby permit transistor 63 to conduct. The result of this action is that control lead 48 is pulled essentially to ground potential while both of the other control leads are positive.

Considering now the application of the control potentials to the actual channel selecting portion of the circuit, as long as control lead 48 is positive connections are established between channel C and one of the channels A or B in essentially the same manner that was described in connection with FIG. 1. In other words, if the control signal on lead 30′ is positive, transmission to channel A is blocked and transmission between channels B and C is enabled. Thus, a start pulse from source 54 would cause a single cycle of the sinusoidal wave on channel C to be coupled through to channel B as illustrated in the wave diagram adjacent to transformer winding 11*a*. At this time no output signal is derived from transformer winding 10*a* in channel A. However, that channel is terminated since terminating diodes 18 and 19 are conducting as previously described.

If both of the source output control signals are positive such as when a data ZERO occurs after a start pulse, control lead 48 is at ground and leads 28′ and 30′ are characterized by positive control voltages. This combination of control signals biases transmission diodes 13, 13 and 14, 14 to their nonconducting conditions, thereby preventing signal coupling between channel C and either of the channels A or B. However, at this time the terminating diodes 18, 19, 22, and 23 are biased for conduction. Terminating diodes 51 and 52 are also biased for conduction. Thus, a control current may flow in two paths. A first path is from control lead 28′ through the two halves of transformer winding 11*b*, resistors 47, terminating diodes 22 and 23, terminating resistors 20′ and 21′, terminal 26, center tap 27, the two halves of transformer winding 12*b*, two of the resistors 47, diodes 51 and 52, terminating resistors 49 and 50, control lead 48, and transistor 63 to ground. A similar control path may be traced from lead 30′ through transformer winding 10*b* and its associated terminating diodes and resistors to transformer winding 12*b* and from there back to ground through control lead 48 and transistor 63. Under these conditions resistors 49 and 50 provide to channel C a proper terminating impedance to replace the impedance formerly presented to that channel by the channels A and B when they were operating.

Wave forms illustrating the control pulse sequence start, ONE, ZERO, ONE, are shown adjacent to the output connections for sources 53 and 54 and also at the connections from transformers 10 and 11 to the channels A and B. During this entire sequence, however, the continuous signal received on channel C also appears at channel D.

Although this invention has been described in connection with particular embodiments thereof it is to be understood that additional embodiments or modifications which would be obvious to one skilled in the art are included within the spirit and scope of the invention.

What is claimed is:

1. A channel selecting circuit for establishing signal communication between a first channel and one of at least two other channels, said circuit comprising three transformers, each of said transformers having first and second windings, a center tap on the second winding of each of said transformers, said first windings of each of said transformers being connected to a different one of said communication channels, four transmission diodes connecting terminals of the second winding on the transformer connected to said first channel to the respective terminals of the second winding of the transformers connected to second and third ones of said channels, all of said diodes being poled for conduction in the same direction with respect to said first channel transformer, two terminating resistors, each of said resistors having a center tap connection, four terminating diodes, each two of said terminating diodes connecting a different one of said terminating resistors between second winding terminals of a different one of said second and third channel transformers, respectively, each of said resistors presenting in the first winding of its transformer a resistance that is substantially the same as the characteristic impedance of the corresponding channel, said terminating diodes being poled for forward conduction in the same direction with respect to the center taps on their corresponding terminating resistors, a connection joining said center tap connections of said terminating resistors to a center tap connection on the second winding of said first channel transformer, and a circuit applying complementary bias signals to second winding center tap connections of said second and third channel transformers for controlling conduction of said transmission and terminating diodes.

2. A channel selecting circuit for establishing signal communication between a first communication channel and at least one of a group of other signal communication channels, said circuit comprising a plurality of transformers each having a first winding thereof connected to a different one of said communication channels, each of said transformers also having a center tap on a second winding thereof, a plurality of pairs of transmission diodes, each pair of said diodes being connected in series between second winding terminals of the first channel transformer and second winding terminals of a different one of the other recited channel transformers, separate center tapped terminating resistors connected between second winding terminals of said other channel transformers, connections for each of said terminating resistors including a pair of terminating diodes poled for forward conduction toward the center tap of the corresponding resistor, a lead interconnecting the second winding center tap of said first channel transformer with the center taps of at least a portion of said terminating resistors, and means applying bias signals to the second windings of said other transformers for biasing the pair of transmitting diodes connected to the second winding of at least one of said other channel transformers into a conducting condition while the corresponding terminating diodes are biased into a nonconducting condition, said bias means also biasing other pairs of transmitting diodes into their nonconducting conditions while their corresponding terminating diodes are biased for conduction.

3. The channel selecting circuit in accordance with claim 1, in which said bias means are adapted to bias transmitting diodes for conduction by means of potentials which have magnitudes in excess of the anticipated peak signal on any of said communication channels.

4. A channel selecting circuit for establishing signal communication between a first channel and one of at least two other channels, said circuit comprising three transformers each having first and second windings and a center tap on each of said second windings, each of said first windings being adapted to be coupled to a different one of said communication channels, four transmission diodes connecting second winding terminals of said first channel transformer to corresponding second winding terminals of the second and third ones of said other channel transformers, all of said diodes being poled for forward conduction away from said first channel transformer, two resistors, each of said resistors having a center tap connection, four diodes connecting said resistors between second winding terminals of said second and third channel transformers, respectively, each of the last-mentioned diodes being poled for forward conduction of electric current toward the center tap of its corresponding resistor, and a bias current path including the center tap and second winding of one of said second and third channel transformers, the one of said resistors of the same channel, and both halves of the second windings of the remaining two channel transformers.

5. A channel selecting circuit comprising three transformers, each having a first winding adapted to be connected to a different communication channel and each having a second winding with a center tap thereon, pairs of transmission diodes connecting second winding terminals of a first transformer to second winding terminals of the other transformers, respectively, additional means connecting the second winding terminals of said other transformers to the second winding center tap of said first transformer, and means applying bias control signals to second winding center taps of said other transformers for biasing the pair of transmission diodes connected to at least one of said other transformer second windings into conduction while at the same time biasing corresponding diodes connected to the remaining other transformers to nonconducting conditions.

6. A channel selecting circuit comprising at least two transformers each having a first winding adapted to be connected to a different communication channel, a pair of transmission diodes connected between the second winding terminals of a first one of said transformers and the second winding terminals of another of the transformers, all of said diodes being poled for conduction in the same direction with respect to said first transformer, a center tap on each of said second windings, two common emitter transistor amplifiers, means connecting an output electrode of each of said amplifiers to a second winding center tap of different ones of said transformers, a source of complementary voltage pulse signals, a pair of diodes each connected between an output terminal of said complementary signal source and an input terminal of one of said amplifiers, the last-mentioned diodes each being poled so that source signals tending to bias the diode on also bias the other of the last-mentioned diodes off, and each of said amplifiers being adapted in its connection to its respective one of said last-mentioned diodes to be biased on or off as its corresponding diode is biased off or on, respectively.

7. A channel selecting circuit comprising three transformers, a first winding of each of said transformers being adapted for coupling to a communication channel, transmission diodes interconnecting a second winding on a first one of said transformers to the second windings of each of the second and third ones of said transformers, a center tap on the second winding of each of said transformers, a connection from the terminals of the second winding of each of said second and third transformers to the center tap of said first transformer, means connecting a source of control signals to the terminals of the second winding of said first transformer, means connecting two other control signal sources to second winding center taps of said second and third transformers, and at least one of said control signals having complementary amplitude characteristics with respect to the other of said control signals whereby said control signal sources co-operate to bias said transmission diodes.

8. A channel selecting circuit for coupling successive time portions of a signal on a first channel to different ones of second and third communication channels, said selecting circuit comprising a first transformer receiving said signal from said first channel, second and third transformers coupling signals to said second and third communication channels, each of said transformers having a center tapped winding inductively coupled to the respective channel, two pairs of transmission devices having asymmetrical conduction characteristics, means connecting different ones of said devices between the terminals of the center tapped winding of said first transformer and corresponding terminals of center tapped windings of said second and third transformers, two pulse sources, and means applying pulses from said sources for controlling said transmission devices to couple signals in said first channel to one of said second or third channels, said applying means comprising a connection from each of said pulse sources to the center tap of the center tapped winding of one of said second and third transformers, an inverting AND logic circuit responsive to signals of a first predetermined type on the last-mentioned connections for producing a signal of a complementary amplitude type, and means applying said complementary amplitude signal to the terminals of the second winding of said first transformer.

9. A channel selecting circuit comprising a first communication channel, two or more other communication channels, means connecting said first channel to each of said other channels, a coil connected across each of said communication channels, transmission diodes connected in series in the conductors of each of said other channels, a half-phantom circuit applying a control current to center taps of the coils connected across said other channels for controlling conductivity of said diodes, and means connecting the terminals of said coils in said other channels to a center tap of the coil which is connected across said first channel.

10. The channel selecting circuit in accordance with claim 9 in which said connecting means includes two center tapped resistors, two pairs of terminating diodes, each of said pairs connecting a different one of said resistors across one coil of one of said other channels, each resistor presenting to its channel the characteristic impedance of the channel when its diodes are conducting, and a connection from said resistor center taps to the center tap of said first channel coil, said control current biasing said terminating diodes conducting or nonconducting when their corresponding channel transmission diodes are nonconducting or conducting.

References Cited in the file of this patent

UNITED STATES PATENTS

| | | |
|---|---|---|
| 2,644,036 | Jones | June 30, 1953 |
| 2,763,840 | Pfleger | Sept. 18, 1956 |
| 2,904,677 | Heidester | Sept. 15, 1959 |
| 2,994,741 | Kallsson | Aug. 1, 1961 |
| 3,027,524 | May | Mar. 27, 1962 |